United States Patent
Klein et al.

(10) Patent No.: US 11,244,082 B2
(45) Date of Patent: Feb. 8, 2022

(54) ONE-CHIP SYSTEM FOR A VEHICLE

(71) Applicant: Audi AG, Ingolstadt (DE)

(72) Inventors: Markus Klein, Pförring (DE); Kamil Zawadzki, Munich (DE); Changsup Ahn, Ingolstadt (DE); Hans Georg Gruber, Ingolstadt (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 16/762,732

(22) PCT Filed: Nov. 19, 2018

(86) PCT No.: PCT/EP2018/081704
§ 371 (c)(1),
(2) Date: May 8, 2020

(87) PCT Pub. No.: WO2019/101671
PCT Pub. Date: May 31, 2019

(65) Prior Publication Data
US 2020/0380175 A1    Dec. 3, 2020

(30) Foreign Application Priority Data
Nov. 21, 2017    (DE) ..................... 10 2017 220 764.7

(51) Int. Cl.
*G06F 21/85* (2013.01)
*B60R 25/24* (2013.01)
(Continued)

(52) U.S. Cl.
CPC ............ *G06F 21/85* (2013.01); *B60R 25/241* (2013.01); *G06F 21/629* (2013.01); *G06F 21/71* (2013.01); *G06F 2221/2141* (2013.01)

(58) Field of Classification Search
CPC ..... B60R 25/241; G06F 21/53; G06F 21/604; G06F 21/629; G06F 21/70; G06F 21/71;
(Continued)

(56) References Cited

U.S. PATENT DOCUMENTS

| 10,592,270 B2 | 3/2020 | Brewerton et al. |
| 10,657,039 B2 | 5/2020 | Biewer et al. |

(Continued)

FOREIGN PATENT DOCUMENTS

| CN | 101000583 A | 7/2007 |
| CN | 105656884 A | 6/2016 |

(Continued)

OTHER PUBLICATIONS

International Search Report and Written Opinion of the International Searching Authority directed to related International Patent Application No. PCT/EP2018/081704, dated Feb. 18, 2019, with attached English-language translation; 15 pages.
(Continued)

*Primary Examiner* — Kevin Bechtel
(74) *Attorney, Agent, or Firm* — Sterne, Kessler, Goldstein & Fox P.L.L.C.

(57) ABSTRACT

The present disclosure relates to a one-chip system for a control device of a vehicle with at least one bus, at least one control unit connected to the at least one bus for controlling a peripheral device assigned to the at least one control unit and several processors connected to the at least one bus.

12 Claims, 3 Drawing Sheets

(51) Int. Cl.
*G06F 21/62* (2013.01)
*G06F 21/71* (2013.01)

(58) Field of Classification Search
CPC ... G06F 21/76; G06F 21/85; G06F 2221/2141
See application file for complete search history.

(56) References Cited

U.S. PATENT DOCUMENTS

| | | |
|---|---|---|
| 2008/0005427 A1 | 1/2008 | Satou et al. |
| 2009/0300759 A1* | 12/2009 | Wang .................. H04L 63/1458 726/22 |
| 2012/0036572 A1 | 2/2012 | Yoo |
| 2012/0137119 A1 | 5/2012 | Doerr et al. |
| 2013/0031290 A1 | 1/2013 | Schwartz et al. |
| 2015/0269396 A1 | 9/2015 | Grafton |
| 2016/0004647 A1* | 1/2016 | Eppensteiner .......... G06F 12/14 710/110 |
| 2016/0182539 A1 | 6/2016 | Edwards et al. |
| 2017/0185345 A1 | 6/2017 | Lim et al. |
| 2018/0039797 A1* | 2/2018 | Lambert ............. G06F 13/4282 |
| 2018/0173898 A1* | 6/2018 | Sugita .................... G06F 21/62 |

FOREIGN PATENT DOCUMENTS

| | | |
|---|---|---|
| CN | 105765541 A | 7/2016 |
| DE | 102015002191 A1 | 8/2015 |
| DE | 102016123744 A1 | 6/2017 |
| EP | 1260910 A2 | 11/2002 |
| JP | 2006338385 A | 12/2006 |
| WO | WO 2016/105832 A1 | 6/2016 |

OTHER PUBLICATIONS

"Serial Peripheral Interface," Wikipedia, The Free Encyclopedia, Nov. 17, 2017; 12 pages; available at: https://en.wikipedia.org/wiki/Serial_Peripheral_Interface.

International Preliminary Report on Patentability directed to related International Patent Application No. PCT/EP2018/081704, completed Mar. 18, 2020, with attached English-language translation; 11 pages.

* cited by examiner

ONE-CHIP SYSTEM FOR A VEHICLE

TECHNICAL FIELD

The present disclosure relates to a one-chip system (system-on-chip, SoC) for a control device of a vehicle with at least one bus, at least one control unit (controller, Ctrlr) connected to the at least one bus for controlling a peripheral device assigned to the at least one control unit and several processors (central processing unit, CPU) connected to the at least one bus.

BACKGROUND

One-chip systems integrate several components of a computer in one component and are increasingly used in modern vehicles, for example, in a central control unit (electronic control unit, ECU), which is used to control different functional systems of a vehicle. The functional systems of a vehicle include, on the one hand, safety systems which relate to the driving safety of the vehicle, for example, an engine control or a braking system, and, on the other hand, comfort systems, which increase the comfort of a driver of the vehicle or other occupants of the vehicle, for example, an infotainment system or an air conditioning system.

Each functional system comprises one or more functional units arranged in the vehicle and an operating system (OS) assigned to the functional units, which is stored and executed in the central control unit. Correspondingly, several safety-critical operating systems and several other, for example, comfort-related, operating systems are usually stored in the central control device and are executed in parallel by the control device.

Security systems and/or other functional systems, such as comfort systems, are often not manufactured by a vehicle manufacturer, but are supplied by various third-party manufacturers. This can lead to the operating systems assigned to each other interfering with each other. Such mutual interference of the operating systems can be due both to an unintentional programming error and also to the fact that an operating system comprises malware, for example, a computer virus. As a result, an affected operating system can malfunction, which in the case of a safety-critical operating system is associated with an increased risk of the vehicle being involved in an accident.

Against this background, it is a primary concern of the vehicle manufacturer to provide a one-chip system for a control unit of a vehicle with effective protection against mutual interference between the multiple operating systems stored in the control unit and executed in parallel.

The malware itself can offer a possible starting point for effective protection of a control device against malware. Every malware generally has a characteristic byte sequence (signature), which can be used to identify it with a high degree of probability.

For example, US 2012/0036572 A1 discloses a one-chip system for a mobile device for detecting malware. The one-chip system comprises a bus, a network interface connected to the bus, a processor connected to the bus, and a malware detection module connected to the bus. The malware detection module compares data transmitted via the bus by means of a pattern recognition method with signatures of known malware, which are stored in a database arranged in the terminal and are updated regularly.

A disadvantage of such an approach, however, is that in principle complete protection of the system is ruled out at all times. This is because with new unknown malware, no signature is available for comparison. In addition, the signature database available for comparison can be incomplete, for example, as a result of a failure to update, which further increases the risk of a protected device being infected by malware. Apart from this, a mere programming error of an operating system of a functional system can hardly be recognized by a characteristic byte sequence.

To protect a control device of a vehicle, DE 10 2015 002 191 A1 discloses a processor, which uses a security code stored in a system memory for privileged access to a memory of the control device. In contrast, DE 10 2016 123 744 A1 discloses a one-chip system for a mobile terminal of a mobile radio network with a protection system which controls processor accesses to address areas of a working memory and an external storage device, which are connected to the one-chip system.

Another possible way of detecting malware is to analyze the behavior of a peripheral device. WO 2016/105832 A1 discloses a device for detecting malware on a peripheral device which is connected to the device. The device may comprise a one-chip system and is configured to detect an identity of the peripheral device, to monitor communication with the peripheral device and to block the connection to the peripheral device when the monitored communication is incompatible with the detected identity of the peripheral device. However, a router or switch, for example, comes in, which is stored and executed.

EP 1 260 910 A2 describes such a network device with multiple network interfaces, which can also be configured as a firewall with appropriate software in order to protect network participants connected to the network interfaces against unauthorized access. The network device comprises one or more one-chip systems, each of which has a plurality of network interfaces for connecting network participants and a plurality of standard interfaces, a bus and a plurality of processors, which are connected to the plurality of interfaces via the at least one bus, so that each processor has access to each interface. However, such a firewall itself can be the target of a malware attack and its functionality can be impaired by the malware, and as a result of which the effective protection of the computer network is reduced or eliminated.

BRIEF DESCRIPTION OF DRAWINGS/FIGURES

DETAILED DESCRIPTION

Figure 1:
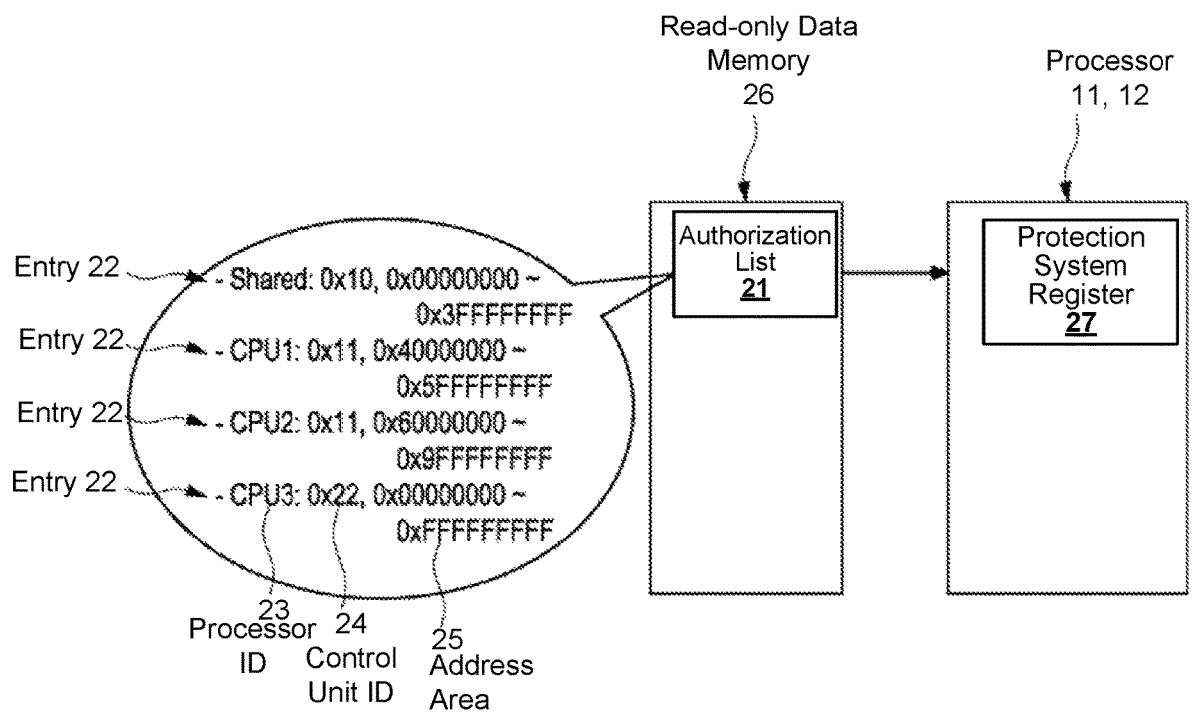
FIG. 1 shows a schematic illustration of an authorization list of a one-chip system stored in a read-only data memory, in accordance with some embodiments.

The present disclosure is, therefore, based on the object of providing a one-chip system, which avoids the disadvantages described and brings about effective protection. Furthermore, another object of the present disclosure is to propose a simple method for creating effective protection of a one-chip system.

In some embodiments, a one-chip system or a system-on-chip ISoC) for a control device of a vehicle is disclosed. The one-chip system includes at least one bus, at least one control unit or controller £Ctrlr) connected to the at least one bus for controlling a peripheral device assigned to the at least one control unit, and a plurality of processors, such as central processing units (CPUs) connected to the at least one bus. In such a one-chip system, basically every processor has access to every control unit and thus to a peripheral device assigned to the control unit. To access a specific peripheral device, a processor transmits a corresponding access request to the control unit assigned to the specific peripheral device. For example, a data memory can be connected as a peripheral device to a corresponding control unit of the one-chip system.

In some embodiments, the one-chip system includes a protection system, such as an Input Output Firewall (IOFW), which is configured to allow permitted access by a specific processor to a specific control unit or by the specific control unit to the specific processor and to prevent prohibited access by a specific processor to a specific control unit or by the specific control unit to the specific processor. The protection system is designed in hardware and consequently is itself protected against harmful interference. The scope of action of each processor can be precisely defined by means of the protection system. In other words, a peripheral device, for example, an external data memory, can be effectively protected against access by a processor. Conversely, the protection system can also protect each processor from an interrupt by a peripheral device.

In some embodiments, the protection system includes an authorization list with at least one entry, which corresponds to a permitted access or a prohibited access. The authorization list can, therefore, include both positive entries, that is, authorization entries, and also negative entries, that is, exclusion entries. This permits easy definition of rules and exceptions.

In some embodiments, each entry has a tuple, which includes an ID of a processor, an ID of a control unit, an address area of a peripheral device assigned to the control unit, and a maximum frequency of permitted accesses. By specifying address ranges, access permissions and access prohibitions for a single peripheral device can be differentiated. This enables a shared and simultaneously properly separated use of a peripheral device by several processors. The maximum frequency of permitted accesses is to be understood as a maximum number of permitted accesses per unit of time. With such a specification, blocking overloading of the processor due to interrupts, such as denial of service (DoS), caused by the peripheral device can be prevented.

In some embodiments, a read-only data memory (ROM) is provided, in which the authorization list can be stored or is stored. The authorization list is effectively protected against uncontrolled overwriting in the read-only data memory.

In some embodiments, a first bus and a second bus separate from the first bus are provided, and the multiple processors are connected to the protection system via the first bus, and the protection system is connected to the at least one control unit via the second bus. With this configuration, any communication between a processor and a peripheral device must pass through the protection system.

In some embodiments, the protection system is configured to output a permitted access request received from the first bus or the second bus to the second bus or to the first bus, respectively, and to block a prohibited access request received from the first bus or the second bus. The configuration can accordingly be referred to as bus blocking, since it can prevent, i.e., block, access by a processor to an address area of a peripheral device or access by a peripheral device to a processor, for example, a DoS attack. Consequently, neither the processor nor the control unit assigned to the peripheral device requires knowledge of the authorization list of the protection system.

In some embodiments, by way of a non-limiting example, exactly one bus is provided and the protection system is connected to the bus. With this configuration, any communication between a processor and a peripheral device can be monitored by the protection system. A second bus is not required.

In some embodiments, the protection system is configured to monitor the bus and, in the event of a prohibited access request, to notify a processor and/or a participating control unit. A prohibited access request arrives at a participating processor or a participating control unit. However, the participating processor or the participating control unit can refrain from carrying out the requested access on the basis of the notification. A participating peripheral device usually triggers a so-called interrupt to cause a participating processor to react to an event that has occurred in the peripheral device. In the event of a prohibited interrupt or an excessively high frequency of an interrupt that is permitted per se, the protection system can generate a special interrupt to which the participating processors can react appropriately.

In some embodiments, the protection system is connected to the processors and/or the control units via a separate notification line. Accordingly, the protection system can indicate a prohibited access request to the processors or control units by sending a signal via the notification line.

In some embodiments, the bus has an additional notification bit, and the protection system is configured to set the additional notification bit in the event of a prohibited access request. Accordingly, the protection system can indicate the prohibited access request to the processors or control units by setting the notification bit.

In some embodiments, the protection system is configured to modify the data associated with the prohibited access request and transmitted via the bus after the prohibited access request, in particular, to set it to a specific value and preferably to zero. An additional modification of data belonging to the prohibited access request by the protection system can further increase the effectiveness of the protection, in particular, if the control units and/or peripheral devices connected to the control units are configured, to discard data modified by the protection system in a special way, for example, by zeroing it, i.e., not processing it.

The present disclosure also relates to a method for controlling mutual access of a processor, such as a central processing unit, of a one-chip system according to various embodiments as described herein, and a control unit of the one-chip system for controlling a peripheral device which is assigned to the control unit and in which a protection system of the one-chip system permits the processor to access the control unit or allows the control unit to access the processor, and prevents unauthorized access by the processor to the control unit or by the control unit to the processor. In this way, the protection system can precisely define the effective range of each processor. Different operating systems, which are executed by different processors, can be properly separated from each other. Conversely, the processors can be protected from interrupts by the peripheral devices.

In some embodiments, an authorization list, which has at least one entry corresponding to a permitted access or a prohibited access, is loaded into the protection system from a read-only memory (ROM) during a boot sequence of the one-chip system and/or each access by a specific processor to a specific control device is compared with the authorization list. By way of a non-limiting example, the protection system is initialized at a very early stage in the operation of the one-chip system, where it is practically impossible for the initialization to be adversely affected by an operating system of a functional system of the vehicle. During the operation of the one-chip system, a permitted access can be distinguished from a prohibited access by simply comparing the corresponding access request with the authorization list.

Various embodiments are described with reference to the drawings.

FIG. 1 shows a schematic illustration of an authorization list 21 of an embodiment of a one-chip system 10 according to the invention, which list is stored in a read-only data memory 26. The authorization list 21 includes, as a component of a protection system 20 (see FIGS. 2 to 5), a plurality of entries 22, each of which corresponds to a permitted access.

Each entry 22 has a tuple, which has an ID 23 of a processor 11, 12 of the one-chip system 10, an ID 24 of a control unit 15, 16, 17 of the one-chip system 10, and an address area 25 of a peripheral device 40, 50 assigned to the control unit 15, 16, 17. Furthermore, the tuple includes a maximum frequency of permitted accesses (not shown) to the processor 11, 12 designated by the ID 23 by the control unit 15, 16, 17 designated by the ID 24.

Four entries 22 are shown here by way of example only, of which the first entry 22 defines an address area 25 shared by all processors 11, 12 to form a control unit 15, 16, 17, while the remaining three entries 22 in each case exclusively assign an address area 25 of a control unit 15, 16, 17 to a processor 11, 12. However, the authorization list 21 can also include entries 22, each of which corresponds to a prohibited access, in order to be able to easily determine a prohibited area within a permitted address area 25.

The read-only data memory 26 is provided as a Dynamic Random Access Memory (DRAM) and is integrated in the one-chip system 10, but can also be designed as an external component. The processors 11, 12 of the one-chip system 10 each comprise a protection system register 27.

In a boot sequence of the one-chip system 10, first of all an address of the authorization list 21 is determined in the read-only data memory 26. The authorization list 21 is then loaded from the read-only data memory 26 into a protection system 20 via a special protection system register 27. During the operation of the one-chip system, the authorization list 21 is then used by the protection system 20 to compare an access request 30 (see FIG. 3) by a processor 11, 12 with permitted accesses or prohibited accesses.

Figure 2:
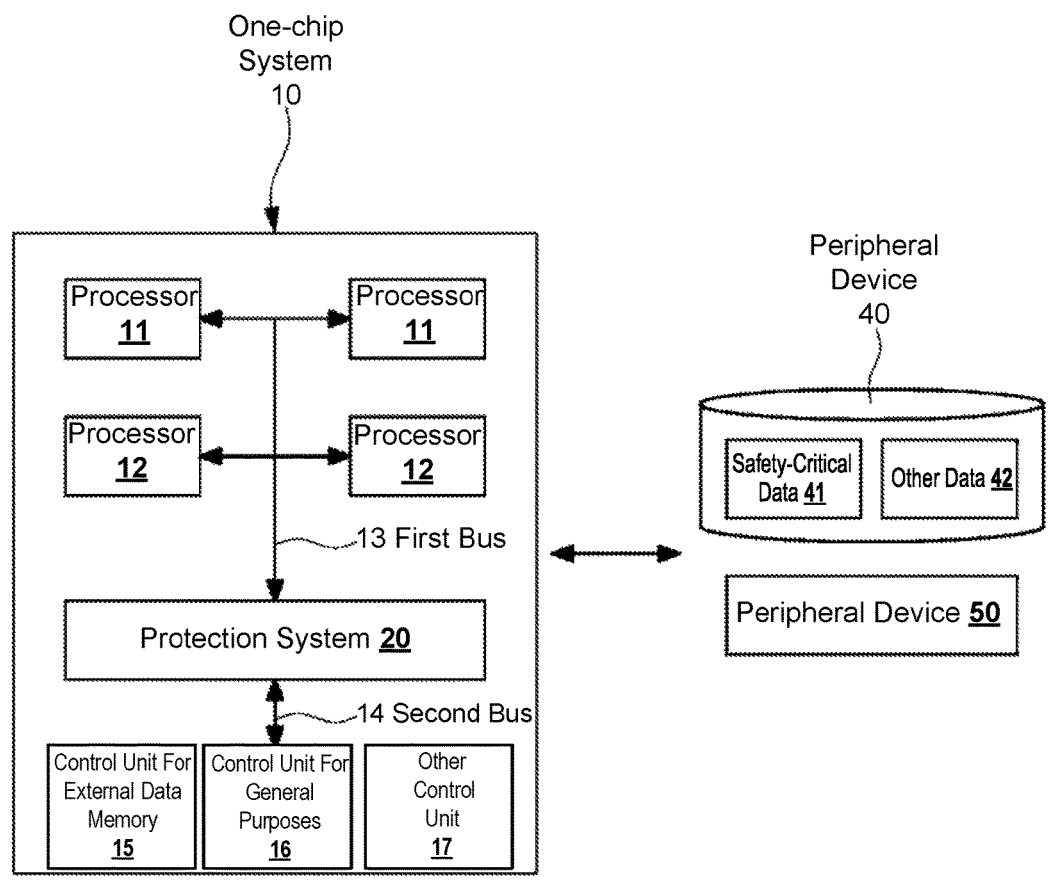
FIG. 2 shows a schematic illustration of a block diagram of the one-chip system, in accordance with some embodiments.

FIG. 2 shows a schematic illustration of a block diagram of an embodiment of the one-chip system 10, as described herein. The one-chip system 10 includes a first bus 13 and a plurality of processors 11, 12 which are connected to the first bus 13. For security reasons, the processors 11 are provided for executing safety-critical operating systems, while the processors 12 are provided for executing other operating systems.

Furthermore, the one-chip system 10 includes a second bus 14 separate from the first bus 13 and a control unit 15 for external data memories, a control unit 16 for general purposes and another control unit 17. The control units 15, 16, 17 are connected to the second bus 14.

A peripheral device 40, which is designed as an external data memory, is assigned to the control unit 15. Safety-critical data 41 and other data 42 are stored in different address areas 25 in the peripheral device 40. A further peripheral device 50, which is designed as an interface, for example, UART, VC, SPI, is assigned to the control unit 16 and/or the control unit 17.

The one-chip system 10 further includes the protection system 20, which is connected to both the first bus 13 and also the second bus 14. The protection system 20 is configured to compare each access request 30 by a processor 11, 12 to a control unit 15, 16, 17 with the authorization list 21 and to allow a permitted access by a specific processor 11, 12 to a specific control unit 15, 16, 17 and to prevent a prohibited access by a specific processor 11, 12 to a specific control unit 15, 16, 17.

The configuration of the protection system 20 is bus-blocking, so that a permitted access request 30 received from the first bus 13 or from the second bus 14 is respectively output to the second bus 14 or to the first bus 13, and a prohibited access request 30 received from the first bus 13 or from the second bus 14 is blocked, i.e., it is not output to the respective other bus 13, 14.

Figure 3:
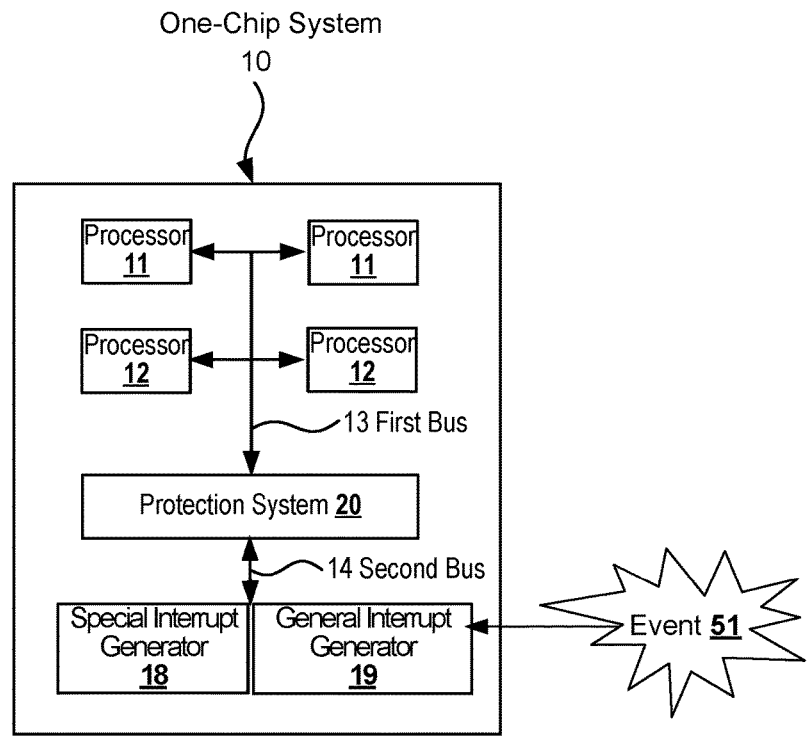
FIG. 3 shows a schematic illustration of a block diagram of the one-chip system when an event occurs in a peripheral device, in accordance with some embodiments.

FIG. 3 shows a schematic representation of a block diagram of the one-chip system 10 shown in FIG. 2 when an event 51 occurs in a peripheral device 50. The event 51 generates an interrupt for the processors 11, 12 in a special interrupt generator 18 or a general interrupt generator 19, such as a generic interrupt controller (GIC), of the one-chip system 10 and transmits it via the second bus 14, the protection system 20 and the first bus 13 transmitted to permitted participating processors 11, 12. If the frequency of the events 51 occurring in the peripheral device 50 and thus the frequency of the interrupts generated exceeds a maximum frequency specified in a corresponding entry 22 of the authorization list 21, the protection system 20 blocks the transmission of the generated interrupts to the processor 11, 12 designated in the entry 22.

Figure 4:
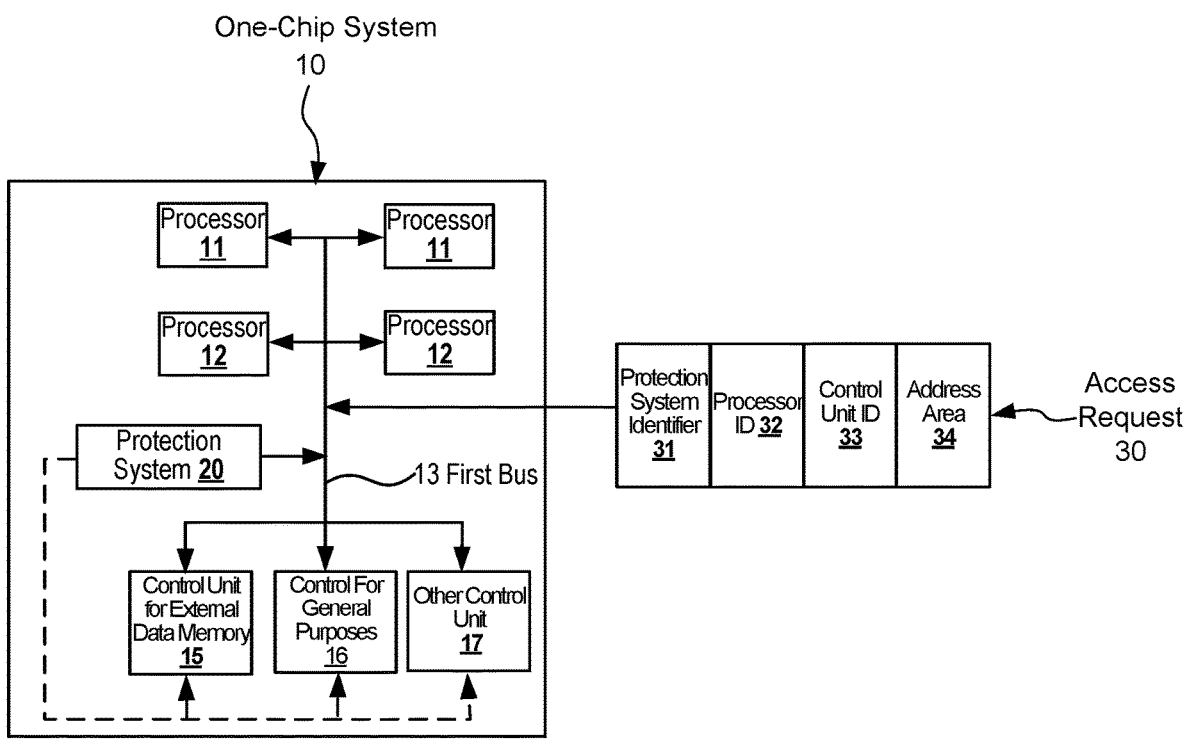
FIG. 4 shows a schematic illustration of a block diagram of the one-chip system, in accordance with some embodiments.

FIG. 4 shows a schematic illustration of a block diagram of a further embodiment of the one-chip system 10, as described herein. The one-chip system 10 differs from the previously described one-chip system in that exactly one bus 13 is provided and the processors 11, 12, the control units 15, 16, 17 and the protection system 20 are connected to the bus 13. The configuration of the protection system 20 is bus-monitoring, so that the bus 13 is monitored and if an access request 30 by a processor 11, 12 is prohibited, the participating control unit 15, 16, 17 is notified via a separate notification line 28. Furthermore, the protection system 20 is configured to set the data associated with the prohibited access request 30, and transmitted via the bus 13 after the prohibited access request 30, to a specific value, for example, zero. Each access request 30 includes a protection system identifier 31, a processor ID 32, a control unit ID 33 and an address area 34. The protection system identifier 31 is ignored by the control units 15, 16, 17.

In accordance with some embodiments, the bus has an additional notification bit. The protection system 20 is accordingly configured to set the additional notification bit in the case of a prohibited access request 30.

In accordance with some embodiments, during the operation of the one-chip system 10, the protection system 20 checks or compares each access request 30 transmitted on the bus 13 and provided with a protection system identifier 31 with each entry 22 of the authorization list 21. When checking an access request 30, the processor ID 32, the control unit ID 33 and the address area 34 of the access request 30 are each compared with the processor ID 23, the control unit ID 24 and the address area 34 of each entry 22 of the authorization list. The protection system 20 permits the access determined by the access requirement 30 if it conforms to an entry 22 of the authorization list. Otherwise, the protection system 20 notifies participating processors 11, 12 and/or control units 15, 16, 17 via the notification line 28 and sets data associated with the prohibited access request 30, which are transmitted via the bus 13 after the prohibited access request 30, to a specific value, for example zero.

Figure 5:
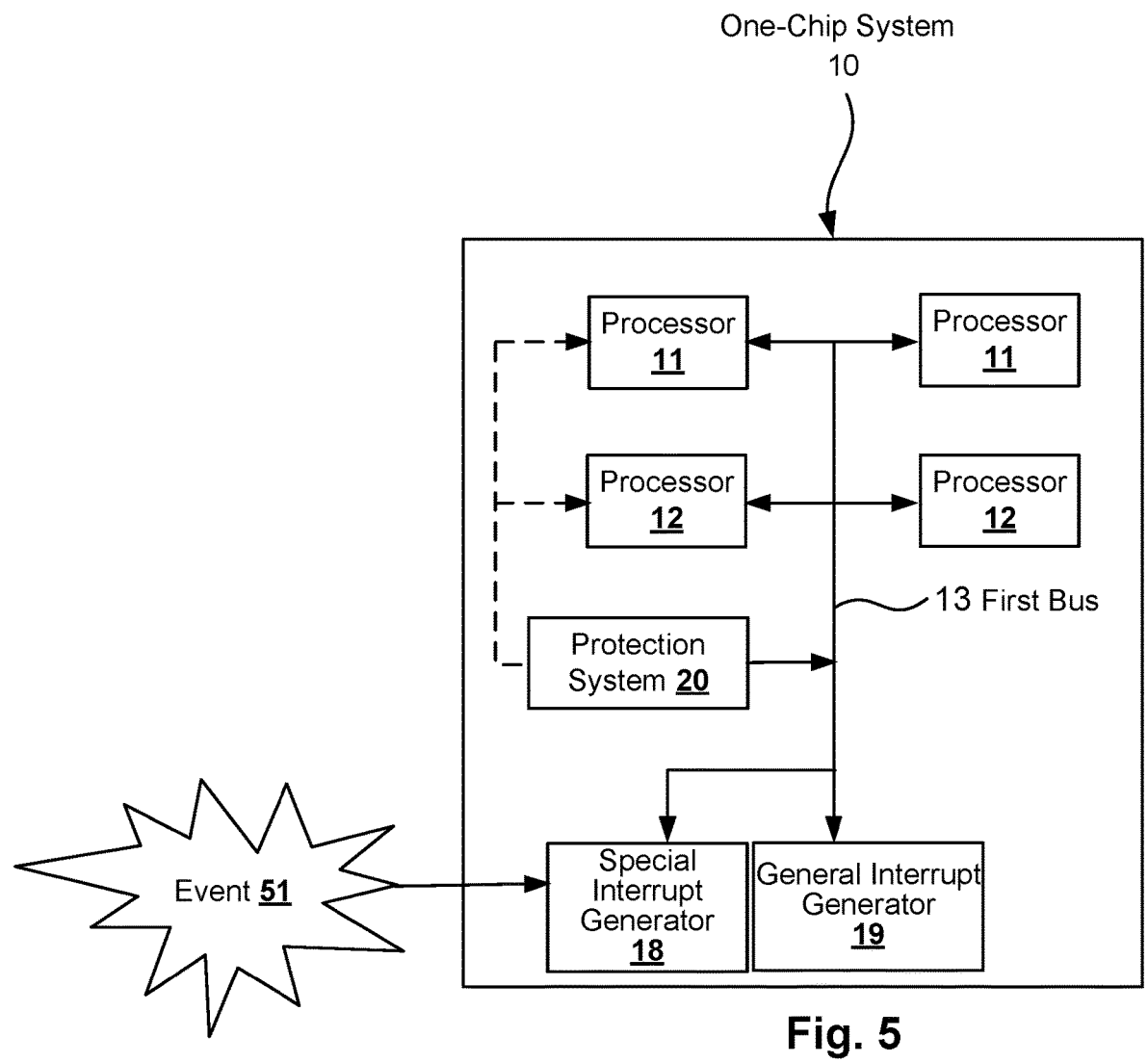
FIG. 5 shows a schematic representation of a block diagram of the one-chip system shown in FIG. 4 when an event occurs in a peripheral device, in accordance with some embodiments.

FIG. 5 shows a schematic representation of a block diagram of the one-chip system 10 shown in FIG. 4 when an event 51 occurs in a peripheral device 50 (see FIG. 2). The event 51 generates an interrupt for the processors 11, 12 in a special interrupt generator 18 or a general interrupt generator 19 of the one-chip system 10. The protection system 20 notifies potential participating processors 11, 12 via a separate line.

The one-chip system 20 according to an embodiment, as described herein, has the advantage of permitting or prohibiting accesses by the processors 11, 12 to peripheral devices 40, 50, which are assigned to the control units 15, 16, 17, differentiated according to address areas 25, and also permitting or prohibiting interrupts in the processors 11, 12 by peripheral devices 40, 50. Because the corresponding protection system 20 is implemented in hardware as a component of the one-chip system 20, it cannot itself be impaired by malicious software. The security-relevant authorization list 21 is protected from impairment by a read-only data memory 21 and initializes the protection system 20 during the boot sequence of the one-chip system 10. In this way, system-critical operating systems of functional systems of a vehicle can be effectively protected against being affected by programming errors or malware.

LIST OF REFERENCE SIGNS

10 One-chip system
11 Processor
12 Processor
13 (First) bus
14 Second bus
15 Control unit for external data memory
16 Control unit for general purposes
17 Other control unit
18 Special interrupt generator
19 General interrupt generator
20 Protection system
21 Authorization list
22 Entry
23 Processor ID
24 Control unit ID
25 Address area
26 Read-only data memory
27 Protection system register
28 Notification line
30 Access request
31 Protection system identifier
32 Processor ID
33 Control unit ID
34 Address area
40 Peripheral device
41 Safety-critical data
42 Other data
50 Peripheral device
51 Event

The invention claimed is:

1. A one-chip system for a control device of a vehicle, the one-chip system comprising:
a protection system;
a first bus;
a peripheral device;
a plurality of processors connected to the first bus and the protection system; and
a plurality of control units connected to the first bus for controlling the peripheral device assigned to a control unit of the plurality of control units,
wherein the protection system is configured to:
allow permitted access, by a first processor of the plurality of processors to the control unit and by the control unit to the first processor, based on an authorization list with at least a first entry that corresponds to the permitted access, wherein the at least first entry that corresponds to the permitted access includes a tuple including an identification (ID) of the first processor, an ID of the control unit, an address area of the peripheral device assigned to the control unit, and a maximum frequency of the permitted access;
prevent prohibited access, by the first processor to the control unit and by the control unit to the first processor, based on a frequency of interrupts exceeding the maximum frequency of the permitted access included in the tuple of the at least first entry, and
prevent prohibited access, by a second processor to the control unit and by the control unit to the second processor, based on the authorization list not including at least a second entry that corresponds to the prohibited access.

2. The one-chip system of claim 1, further comprising a read-only data memory configured to store the authorization list.

3. The one-chip system of claim 1, further comprising a second bus, wherein the plurality of processors are connected to the protection system via the first bus, and wherein the protection system is connected to the control unit via the second bus.

4. The one-chip system of claim 3, wherein the protection system is further configured to output a permitted access request received from the first bus or from the second bus to the second bus or to the first bus, respectively, and to block a prohibited access request received from the first bus or from the second bus.

5. The one-chip system of claim 4, wherein the protection system is further configured to monitor the first bus or the second bus and to notify the first processor or the control unit upon monitoring of the prohibited access request.

6. The one-chip system of claim 5, wherein the protection system is connected via a notification line to the first processor and/or the control unit.

7. The one-chip system of claim 5, wherein the first bus or the second bus has an additional notification bit, and wherein the protection system is further configured to set the additional notification bit upon monitoring of the prohibited access request.

8. The one-chip system of claim 7, wherein the protection system is further configured to modify data assigned to the prohibited access request and transmitted via the first or second bus after the prohibited access request to set the data to a specific value.

9. The one-chip system of claim 8, wherein the specific value is zero.

10. A method for controlling reciprocal access by a plurality of processors and a control unit of a one-chip system of a vehicle for controlling a peripheral device assigned to the control unit, the method comprising:
- allowing, by a protection system of the one-chip system, permitted access by a first processor to the control unit and by the control unit to the first processor, based on an authorization list with at least a first entry that corresponds to the permitted access, wherein the at least first entry that corresponds to the permitted access includes a tuple including an identification (ID) of the first processor, an ID of the control unit, an address area of the peripheral device assigned to the control unit, and a maximum frequency of the permitted access;
- preventing prohibited access, by the first processor to the control unit and by the control unit to the first processor, based on a frequency of interrupts exceeding the maximum frequency of the permitted access included in the tuple of the at least first entry; and
- preventing, by the protection system, prohibited access by a second processor to the control unit and by the control unit to the second processor, based on the authorization list not including at least a second entry that corresponds to the prohibited access.

11. The method of claim 10, further comprising:
loading, from a read-only data memory to the protection system, the authorization list during a boot sequence of the one-chip system.

12. The method of claim 10, further comprising:
loading, from a read-only data memory to the protection system, an authorization list during each access request by the first processor to the control unit.

* * * * *